UNITED STATES PATENT OFFICE.

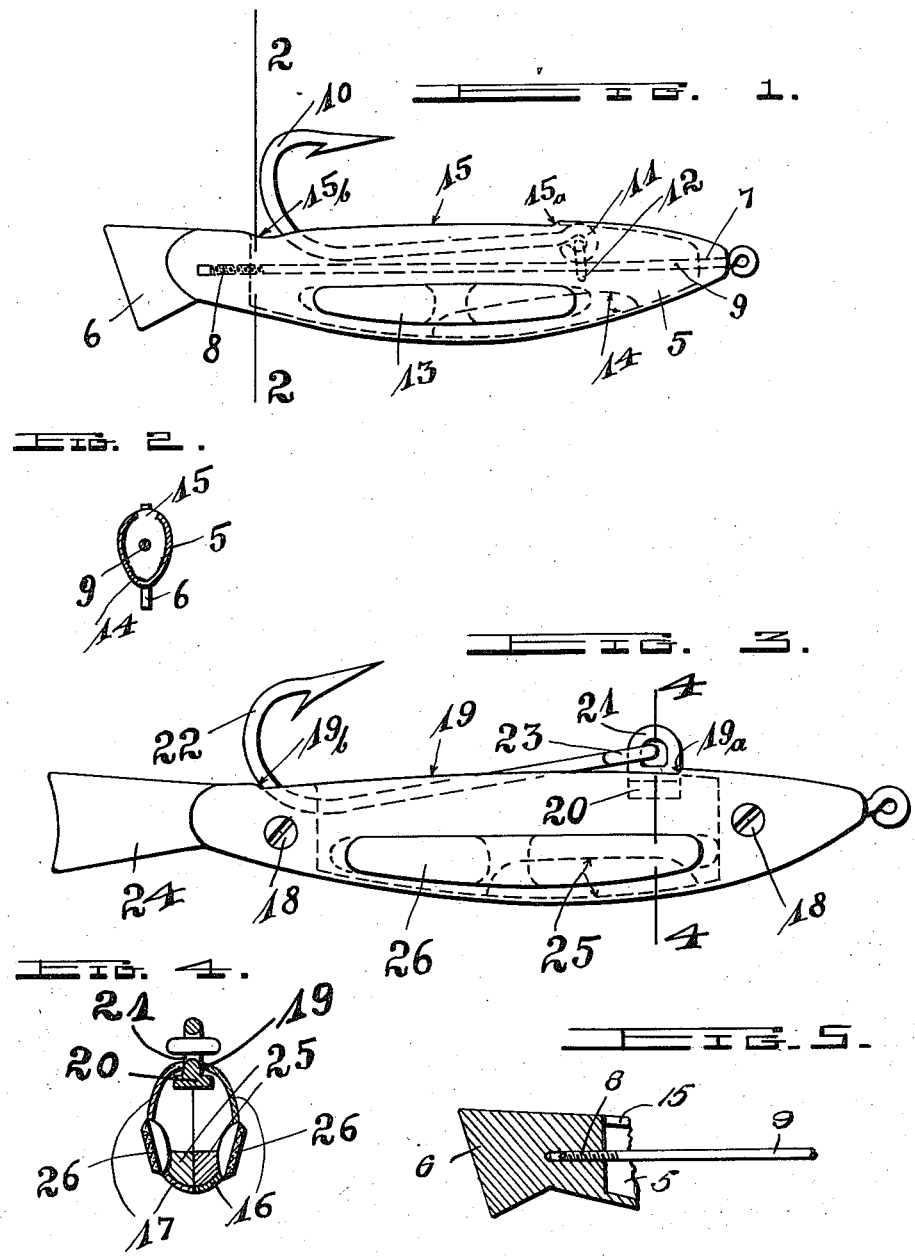

SUYEJI SAKAUE, OF EAST SAN PEDRO, CALIFORNIA.

ARTIFICIAL BAIT.

1,296,701. Specification of Letters Patent. Patented Mar. 11, 1919.

Application filed June 13, 1918. Serial No. 239,814.

*To all whom it may concern:*

Be it known that I, SUYEJI SAKAUE, a subject of the Japanese Empire, residing at East San Pedro, in the county of Los Angeles and State of California, have invented a new and useful Artificial Bait, of which the following is a specification.

This invention relates to devices (so called wabblers and wigglers) for catching fish, and more especially to such devices for catching tuna and similar large fishes.

One object of the invention is to provide a device which most nearly resembles such small fishes, usually devoured by the fishes to be caught with the device.

Another object is to provide a device in which the hook is largely hidden within a suitable compartment of the device, the connection end of the hook slidingly and otherwise suitably engaging with the device so as to leave the compartment when a catch is made with the hook.

Another object is to provide the sides of the device with suitable inlays, made of shining pieces of shells or other similar suitable materials, to make the device shine similar to the shining underside of fishes.

Other objects will appear from the following description and appended claim as well as from the accompanying drawing, in which—

Figure 1 is a side elevation of the device, the hook in its hidden position just with the point projecting out of the recess or suitable compartment in the device.

Fig. 2 is a cross section of the device on line 2—2 of Fig. 1.

Fig. 3 is a side elevation of a slightly modified form of the device, the hook being also in its hidden position with only the point projecting out of the body of the device.

Fig. 4 is a cross section of the device on line 4—4 of Fig. 3.

Fig. 5 is a sectional view showing the screw-threaded connection between the tail piece and the rod or pin.

Similar numbers refer to similar parts throughout the several views.

In Fig. 1, 5 designates the body of the device and 6 the tail end. The front end of the body 5 is provided with an opening 7 through which a bar or pin 9 is inserted, having a threaded end 8, which is screwed into the tail end of the device within the body. The hook 10 is provided with an eye end 11, which is engaged with the bar 9 by the ring or link 12. In the sides of the body there are suitable holes or recesses into which the inlays 13 are suitably disposed, the inlays being made of the shiny parts of shells or other similar suitable materials. The body is made hollow, and, to insure a proper floating or disposition when drawn through the water, a suitably sized weight 14 is provided within the body in the normally lower part. The upper part or so to say the back of the so formed fish is provided with a suitable slot 15, through which the connection end 11 of the hook 10 is inserted with the connecting link, the bar or bolt 9 being disposed through the link and screwed into the rear end of the body as described above, thereby engaging the hook slidingly and swingably to the body.

When disposing this device into the water, the hook is placed largely within the hollow body as illustrated in Fig. 1, and in this position drawn through the water for a catch. A fish, trying to swallow this device (the supposed smaller fish) naturally is caught on the hook 10, which immediately disengages from its hidden position with the engaging end and link 12 sliding along the bar 9 from the point 15$_a$ to the point 15$_b$ in the slot 15. The hook is then entirely outside of the device except for the small part, forming the engaging end 11, engaging with the link 12.

In Figs. 3 and 4 is a slightly modified form of the device, the body consisting of the two halves 16 and 17, held together by the screws 18, and the engaging end 23 of the hook 22 engaging with a block 20 instead of the link 12 in Fig. 1. The body in this slightly modified construction is also provided with a slot as indicated at 19. The block 20 is large enough to prevent a disengagement of this block through slipping out of the slot, while the thinner hook or eye-part of the block, indicated at 21, is slidingly disposed in the slot 19. The hook 22 engages with its eye- or engaging end 23 the eye-part 21 of the block 20. This modified form is also provided with a tail end 24, a balancing block 25, and with the shining inlays 26 in the sides of the body, similar to the similar details in the first described device.

The block 20 is naturally placed between the two halves of the body before the halves are screwed together by the screws 18, and the hook 22 is then in a similar manner as the hook 10 in Fig. 1 engaged with the body. The hidden position within the body is illustrated in Fig. 3, while the hook may also slip out of the body as described in connection with the device in Fig. 1, the block 20 being able to slide in the slot 19 from the end $19_a$ to the end $19_b$, as will all easily be understood.

The hooks in both forms, 10 in Fig. 1 and 22 in Fig. 3, are both held in their forward position clamped between the side plates of the body within the slots 15 and 19 respectively, since the body plates are made of thin sheet metal which naturally allow a certain spring action, enough in the split part, that is on the top side, so that the hook may easily be inserted, in which position the hook remains locked or clamped or engaged just enough not to slip out by the pressure of the water, but not enough to withstand the pulling of the fish or other game caught with such hooks. A catching of the fish or other game on the hook causes the hook to slip out of the slot rearwardly leaving only the engaging or eye-end engaged with the body of the device while the hook end projects beyond the rear end of the tail end of the device, as will easily be understood, allowing the game to fully swallow the hook or at least getting more severely engaged on the hook.

Having thus described my invention, I claim:

In a fish bait of the class described, a hollow body having the appearance of a small fish and having a longitudinal slot in the top side, a hook having an engaging member slidingly disposed in the slot for longitudinal movement so as to allow the hook to rest with its larger part within the slot slightly clamped between the sides of the body in such resting position adapted to disengage from this resting position to beyond the rear end of the tail end of the device with only the engaging member of the hook remaining within the slot.

In testimony whereof I hereunto affix my signature in the presence of two witnesses.

SUYEJI SAKAUE.

Witnesses:
  K. KUTO,
  S. HATAYE.